(12) United States Patent
Adachi et al.

(10) Patent No.: US 7,500,471 B2
(45) Date of Patent: Mar. 10, 2009

(54) PRESSURE ACCUMULATION-TYPE FUEL INJECTION DEVICE AND INTERNAL COMBUSTION ENGINE PROVIDED WITH THIS PRESSURE ACCUMULATION-TYPE FUEL INJECTION DEVICE

(75) Inventors: Hitoshi Adachi, Osaka (JP); Tomohiro Otani, Osaka (JP); Fumiya Kotou, Osaka (JP); Hideo Shiomi, Osaka (JP)

(73) Assignee: Yanmar Co., Ltd., Osaka (JP)

( * ) Notice: Subject to any disclaimer, the term of this patent is extended or adjusted under 35 U.S.C. 154(b) by 52 days.

(21) Appl. No.: 11/631,961

(22) PCT Filed: May 19, 2005

(86) PCT No.: PCT/JP2005/009143

§ 371 (c)(1),
(2), (4) Date: Jan. 9, 2007

(87) PCT Pub. No.: WO2006/006300

PCT Pub. Date: Jan. 19, 2006

(65) Prior Publication Data

US 2008/0060617 A1     Mar. 13, 2008

(30) Foreign Application Priority Data

Jul. 12, 2004    (JP)   ............................. 2004-204346

(51) Int. Cl.
*F02M 59/20* (2006.01)
(52) U.S. Cl. ........................ 123/436; 123/456; 123/447

(58) Field of Classification Search ......... 123/435–436, 123/472, 490, 447, 456, 494, 299
See application file for complete search history.

(56) References Cited

U.S. PATENT DOCUMENTS

| | | | | |
|---|---|---|---|---|
| 6,085,727 A | * | 7/2000 | Nakano | 123/447 |
| 6,766,789 B2 | * | 7/2004 | Yamakado et al. | 123/490 |
| 6,910,464 B2 | * | 6/2005 | Ishikawa et al. | 123/458 |
| 7,267,106 B2 | * | 9/2007 | Adachi et al. | 123/436 |
| 2008/0035118 A1 | * | 2/2008 | Toyohara et al. | 123/478 |

FOREIGN PATENT DOCUMENTS

| | | | |
|---|---|---|---|
| EP | 1767766 | * | 3/2007 |
| JP | 5-125985 | * | 5/1993 |
| JP | 2001-164976 | | 6/2001 |
| JP | 2002-303193 | | 10/2002 |
| JP | 2005-248721 | * | 9/2005 |
| JP | 2006-29088 | * | 2/2006 |
| WO | WO 02/081891 | * | 10/2002 |

* cited by examiner

*Primary Examiner*—Hai H Huynh
(74) *Attorney, Agent, or Firm*—Edwards Angell Palmer & Dodge LLP

(57) ABSTRACT

A fuel injection start timing is determined based on the engine revolution or the engine load, and a common rail pressure is detected simultaneous to this fuel injection start timing. The fuel injection duration is then calculated based on the detected value of the common rail pressure. By doing this, it is possible to obtain a fuel injection duration that is suited for the common rail pressure at the actual fuel injection start time, resulting in an appropriate injection amount.

12 Claims, 10 Drawing Sheets

PRESSURE ACCUMULATION-TYPE FUEL INJECTION DEVICE AND INTERNAL COMBUSTION ENGINE PROVIDED WITH THIS PRESSURE ACCUMULATION-TYPE FUEL INJECTION DEVICE

BACKGROUND OF THE INVENTION

1. Field of the Invention

The invention relates to accumulator (common rail) type fuel injection apparatuses, and internal combustion engines provided with those pressure accumulation-type fuel injection devices, that are furnished with an accumulator pipe (also known as "common rail") that is employed in the fuel supply system of an internal combustion engine (such as diesel engines). In particular, the invention relates to measures for appropriately obtaining the injection amount of the fuel that is to be supplied from the injectors to the combustion chamber.

2. Description of the Related Art

In the past, pressure accumulation-type fuel injection devices, which have superior controllability compared to mechanical fuel injection pump-nozzle apparatuses, have been proposed for the fuel supply system of a multi-cylinder diesel engine (for example, see Patent Documents 1 and 2 listed below).

Such fuel injection apparatuses store, in a common rail, fuel that has been pressurized to a predetermined pressure by a high-pressure pump, and the fuel that is stored in the common rail is injected into the combustion chamber from a predetermined injector in accordance with the fuel ejection timing. A controller performs calculations to control the fuel pressure within the common rail (hereinafter, called the common rail pressure) and the injectors so that fuel is injected under the most ideal injection conditions for the operating state of the engine.

Thus, in pressure accumulation-type fuel injection devices it is possible to control not only the fuel injection amount and the injection timing, but also the fuel injection pressure, which is determined by the common rail pressure, according to the operating state of the engine, and thus pressure accumulation-type fuel injection devices have gained attention as injection apparatuses that possess excellent control characteristics. In particular, such pressure accumulation-type fuel injection devices have favorable pressure increase properties in the low revolution speed region of the engine and this allows high-pressure fuel injection to be performed from the low speed region, and therefore the fuel can be atomized over all regions. For this reason as well, pressure accumulation-type fuel injection devices have garnered interest from the standpoint that they can significantly reduce the black smoke that is characteristic of diesel engines.

—Schematic Structure of the Pressure Accumulation-Type Fuel Injection Device—

A general pressure accumulation-type fuel injection device is described below.

FIG. 13 schematically shows the overall configuration of the fuel supply system of a multi-cylinder diesel engine provided with a pressure accumulation-type fuel injection device. This pressure accumulation-type fuel injection device is provided with a plurality of fuel injection valves (hereinafter, referred to simply as injectors) b1 each of which is attached to a cylinder of a diesel engine (hereinafter, referred to simply as an engine) a, a common rail c that accumulates high-pressure fuel that is at relatively high pressure (common rail pressure: 100 MPa, for example), a high-pressure pump (supply pump) f that pressurizes the fuel that is sucked from a fuel tank d by a low-pressure pump e to a high pressure and then ejects it into the common rail c, and a controller (ECU) g for electrically controlling the injectors b and the high-pressure pump f.

Each injector b is attached to the downstream end of a fuel pipe each of which is in communication with the common rail c. The injection of fuel from each injector b is controlled by supplying and cutting off electricity (ON/OFF) to an injection control solenoid valve h that is provided in an intermediate portion of the fuel pipe. That is, the injector b injects the high-pressure fuel that has been supplied from the common rail c toward the combustion chamber of the engine a while its injection control solenoid valve h is open. Thus, it is necessary for the common rail c to accumulate a high predetermined common rail pressure that corresponds to the fuel injection pressure, and thus the common rail c is connected to the high-pressure pump f via a fuel supply pipe i and an ejection valve j.

The ECU g is supplied with various types of engine information such as the engine revolution and the engine load, and outputs a control signal to the injection control solenoid valve h so as to obtain the most suitable fuel injection timing and fuel injection amount, which are determined from these signals. At the same time, the ECU g outputs a control signal to the high-pressure pump f so that the fuel injection pressure becomes an ideal value for the engine revolution or the engine load. Further, a pressure sensor k for detecting the common rail pressure is attached to the common rail c, and the fuel ejection amount that the high-pressure pump f ejects to the common rail c is controlled so that the signal of the pressure sensor k becomes a preset ideal value according to the engine revolution or engine load.

—Method for Calculating the Fuel Injection Timing and the Fuel Injection Duration—

Next, a conventional example of a method for calculating the fuel injection timing and the fuel injection duration with the ECU g is described. FIG. 14 shows the change in the crank signal, the electricity conduction signal to the injection control solenoid valve h, and the common rail pressure, at a timing when fuel is injected from a particular injector b. Here, the crank signal is a pulsed waveform that is transmitted every 6° of rotation of the crank. The operation of injecting fuel from the injector b is executed while the electricity conduction signal to the injection control solenoid valve h is ON.

First, the ECU g calculates the fuel injection start timing based on various types of engine information such as the engine revolution and the engine load. FIG. 14 shows a case in which fuel injection is started at the timing B by starting the supply of electricity to the injection control solenoid valve h.

The fuel injection duration, on the other hand, is calculated by the ECU g based on the fuel injection amount that has been determined and the common rail pressure so as to attain the engine revolution (target revolution) that corresponds to the opening signal that the ECU g receives from the throttle (regulator in marine engines). The injector b continues the fuel injection operation based on the common rail pressure so as to attain the determined fuel injection amount, and the engine revolution in this state is detected and compared to the target revolution, and the fuel injection amount is corrected so that the actual engine revolution approaches the target revolution (feedback correction).

To describe this in further detail, the ECU g determines the fuel injection amount before the timing B (the time when the supply of electricity to the injection control solenoid valve h is started) so as to obtain the engine revolution (target revolution) according to the opening signal of the throttle (regulator in marine engines). Then, the fuel injection duration (this corresponds to the time during which electricity is conducted to the injection control solenoid valve h; the time from the start of fuel injection to the end of fuel injection) is calculated according to the common rail pressure when the crank signal (pulsed waveform) rises (timing A in FIG. 14) before the timing B, and the fuel injection amount that has been determined as above. In FIG. 14, Tdur is found as the fuel injection duration and indicates the timing C at which point the supply of electricity to the injection control solenoid valve h is interrupted to cease fuel injection.

The fuel injection timing and the fuel injection duration thus are found through the above operation.

Patent Document 1: JP 2000-18052A
Patent Document 2: JP 2003-328830A

SUMMARY OF THE INVENTION

As mentioned above, the conventional operation for calculating the fuel injection duration involves calculating a fuel injection duration that matches the common rail pressure that is detected when the crank signal rises (timing A) prior to the timing B. In FIG. 14, the fuel injection duration is calculated based on the detected value "P1" of the common rail pressure.

There exists a time lag from the point that the common rail pressure is detected (timing A) to the point at which fuel injection is actually started (timing B). The common rail pressure may fluctuate during this period from the timing A to the timing B due to the effects of leaking from the common rail c, fuel injection in other cylinders, and the operation of supplying fuel from the high-pressure pump f. In the case of FIG. 14, leaking causes the pressure within the common rail to drop, lowering the common rail pressure at the actual start of fuel injection to a pressure "P2."

There is therefore a difference between the common rail pressure that is used to calculate the fuel injection duration ("P1" above) and the actual common rail pressure at the start of fuel injection ("P2" above), and the fuel injection duration deviates from the correct value by the amount of this difference.

When the pressure within the common rail drops as shown in FIG. 14, it is not possible to obtain a sufficient fuel injection duration (the fuel injection duration that is calculated is shorter than the fuel injection duration that is suited for the common rail pressure "P2"), and this may lead to a situation where the fuel injection amount is not sufficient. Conversely, if the pressure within the common rail increases during the period from the point where the common rail pressure is detected (timing A) to the actual fuel injection start time (timing B), then the fuel injection duration becomes too long (the calculated fuel injection duration becomes longer than the fuel injection duration that is suited for the common rail pressure at the fuel injection start time), causing the fuel injection amount to be too large.

Thus, conventional pressure accumulation-type fuel injection devices had the problem that either the fuel injection amount was not sufficient to obtain the desired engine output or the fuel injection amount was too large and led to an increase in the amount of harmful substances that are discharged.

In particular, as illustrated in Patent Document 2, the act of performing multi-stage injection in order reduce engine noise and vibration is particularly prone to this problem noticeably occurring. A case in which such multi-stage injection is performed is described below.

In pressure accumulation-type fuel injection devices that perform such multi-stage injection, the common rail pressure is detected prior to the previous fuel injection timing (if two stages of injection are performed, the first injection), and the fuel injection duration is calculated for each of the early stage (if two stages of injection are performed, the first injection) and the latter stage (if two stages of injection are performed, the second injection) based on this common rail pressure.

FIG. 15 shows the change in the crank signal, the electricity conduction signal to the injection control solenoid valve h, and the common rail pressure, at a timing where fuel is injected from a certain injector b in two stages. In this case, the ECU g calculates the fuel injection duration based on the common rail pressure at the point that the crank signal rises (timing A in FIG. 15) in the stage prior to the timing B1 in the drawing (the point in time that the supply of electricity to the injection control solenoid valve h for the first injection is started), to determine the fuel injection duration of the first fuel injection (the fuel injection duration where C1 is the point where fuel injection ends; Tdur1 in the drawing) and the injection duration of the second injection (B2 is the point where the supply of electricity to the injection control solenoid valve h begins and C2 is when fuel injection ends; Tdur2 in the drawing).

Thus, in this case as well, the same situation as above occurs for the injection of the first stage, in which a difference occurs between the common rail pressure that is used to calculate the fuel injection duration ("P1" above) and the actual common rail pressure at the start of fuel injection (the pressure "P2" at the timing B1 in the drawing), and the fuel injection duration is deviated from the correct value by the amount of this difference.

Further, with regard to the injection of the second stage, the common rail pressure is significantly lower at the point of this injection due to the injection of the first stage and this causes a large difference between the common rail pressure ("P1") that was used to calculate the fuel injection duration and the actual common rail pressure at the point that fuel injection starts (the pressure "P3" at the timing B2 in the drawing). It was therefore difficult to accurately obtain the fuel injection duration, and this resulted in a high probability that the above problem will occur noticeably.

The invention was arrived at in light of the above matters, and it is an object thereof to provide a pressure accumulation-type fuel injection device, and an internal combustion engine that is provided with this pressure accumulation-type fuel injection device, that allows the amount of fuel to be injected into the combustion chamber from the injectors to be suitably obtained without the fuel injection amount being too much or too little, by optimizing the fuel injection duration that is suited for the common rail pressure at the start of fuel injection.

MEANS FOR SOLVING PROBLEM

—Overview of the Invention—

One solution of the invention for achieving the above object is to detect the common rail pressure at the actual fuel injection start time and calculate the fuel injection duration (fuel injection end time) based on that detected value, so as to obtain a fuel injection duration that is suited for the common rail pressure at the actual fuel injection start time.

—Means for Solution—

Specifically, a prerequisite for the invention is a pressure accumulation-type fuel injection device that is provided with a fuel pump that delivers fuel under pressure, a common rail that holds the fuel that has been delivered under pressure by the fuel pump, and a fuel injection valve that injects fuel that has been supplied from the common rail. This pressure accumulation-type fuel injection device is further furnished with injection amount determination means, injection start time determination means, pressure detection means, and injection duration calculation means. The injection amount determination means is for determining an injection amount of the fuel injection valve in accordance with engine operating state. The injection start time determination means is for determining a fuel injection start time of the fuel injection valve in accordance with engine operating state. The pressure detection means is for detecting a common rail pressure at a fuel injection start time that has been determined by the injection start time determination means. The injection duration calculation means receives a detection signal on the common rail pressure when the pressure detection means detects the common rail pressure, and calculates a fuel injection duration according to that common rail pressure and the injection amount that has been determined by the injection amount determination means. In this configuration, the fuel injection operation of the fuel injection valve is ended at the point that the fuel injection duration that has been calculated by the injection duration calculation means has elapsed from a fuel injection start time of the fuel injection valve.

With these specific features, when injecting fuel into the combustion chamber from a certain fuel injection valve, the injection start time determination means determines the fuel injection start time according to the engine operating state, the injection amount determination means determines the fuel injection amount, and the pressure detection means detects the common rail pressure when this fuel injection start time is reached. Simultaneous to this, the fuel injection valve is opened and fuel is injected into the fuel combustion chamber. When detection of the common rail pressure has been performed, the injection duration calculation means receives a detection signal on the common rail pressure from the pressure detection means, and calculates the fuel injection duration that corresponds to this common rail pressure and the injection amount that has been determined by the injection amount determination means. That is, the operation for calculating the fuel injection duration (time from the start of fuel injection to the end of fuel injection) is started substantially simultaneous to the start of fuel injection. For this reason, it becomes possible to calculate the fuel injection duration based on the common rail pressure at the actual fuel injection start time, yielding a fuel injection duration that is suited for the actual common rail pressure at the fuel injection start time. The result is that it is possible to calculate the injection duration for injecting a proper fuel injection amount, the desired engine output can be achieved, and it is possible to achieve a reduction in the amount of harmful substances that are discharged.

The following two configurations are examples of situations where the invention has been adopted for a pressure accumulation-type fuel injection device that performs multiple injections.

The first example is a case in which the common rail pressure is detected each time a stage of injection (injection stage) is started so as to execute the operation for calculating the fuel injection duration in each stage.

The prerequisite multiple injection type pressure accumulation-type fuel injection device is provided with a fuel pump that delivers fuel under pressure, a common rail that holds the fuel that has been delivered under pressure by the fuel pump, and a fuel injection valve that injects fuel that has been supplied from the common rail, wherein the fuel injection valve performs a plural number of fuel injection operations in a same cylinder during one cycle of the engine. This pressure accumulation-type fuel injection device is furnished with injection amount determination means, injection start time determination means, pressure detection means, and injection duration calculation means. The injection amount determination means is for determining an injection amount of the fuel injection valve for each the fuel injection operation, in accordance with engine operating state. The injection start time determination means is for determining a fuel injection start time of the fuel injection valve in each the fuel injection operation, in accordance with engine operating state. The pressure detection means is for detecting a common rail pressure at each fuel injection start time that has been determined by the injection start time determination means. The injection duration calculation means receives, each time the pressure detection means detects the common rail pressure, a detection signal regarding that common rail pressure, and calculates the fuel injection duration that correspond to that common rail pressure and the fuel injection amount of the respective fuel injection operation that has been determined by the injection amount determination means. Each fuel injection operation is ended at the point that the fuel injection duration that has been calculated by the injection duration calculation means has elapsed from the fuel injection start time of the fuel injection valve.

The following configuration is an example of a case in which, when two or more fuel injection operations are to be performed in a single cycle of the engine, the detected common rail pressure is corrected at the fuel injection timing of each injection stage based on parameters including the common rail pressure that is detected at the current and the previous fuel injection start times and at least the pressure detection times, and the fuel injection duration for each injection stage is calculated according to this corrected rail pressure and the injection amount of the respective fuel injection operation.

The prerequisite multiple injection type pressure accumulation-type fuel injection device is provided with a fuel pump that delivers fuel under pressure, a common rail that holds the fuel that has been delivered under pressure by the fuel pump, and a fuel injection valve that injects fuel that has been supplied from the common rail, wherein the fuel injection valve performs a plural number of fuel injection operations in a same cylinder in one cycle of the engine. The pressure accumulation-type fuel injection device is furnished with injection amount determination means, injection start time determination means, pressure detection means, pressure detection time recognition means, and injection duration calculation means. The injection amount determination means is for determining an injection amount of the fuel injection valve in each the fuel injection operation, according to the engine operating state. The injection start time determination means is for determining a fuel injection start time of the fuel injection valve in each the fuel injection operation, according to the engine operating state. The pressure detection means is for detecting a common rail pressure at each fuel injection start time that has been determined by the injection start time determination means. The pressure detection time recognition means is for recognizing the pressure detection times, that is, the fuel injection start times. The injection duration calculation means receives, for an initial fuel injection operation in a single cycle of the engine, a detection signal on the common rail pressure when the pressure detection means has detected the common rail pressure, and calculates a fuel injection duration that corresponds to that common rail pressure and the fuel injection amount in the respective fuel injection operation that has been determined by the injection amount determination means, and for the second and subsequent fuel injection operations in the single cycle of the engine, corrects this common rail pressure that has been detected at the fuel injection timing of the injection stage based on parameters including the common rail pressure that has been detected at the current and the previous fuel injection start times and at least those pressure detection times, to calculate a fuel injection duration for each stage that corresponds to that corrected common rail pressure and the fuel injection amount in that fuel injection operation that has been determined by the injection amount determination means. Each fuel injection operation is ended at the point that the fuel injection duration that has been calculated by the injection duration calculation means has elapsed from the fuel injection start time of the fuel injection valve in one cycle of the engine.

With such pressure accumulation-type fuel injection devices, it is possible to calculate the fuel injection duration that is suited for the actual common rail pressure at the fuel injection start time in not only the first fuel injection but in the second and subsequent fuel injections as well. The result is that it is possible to secure the benefits of multiple-injection type pressure accumulation-type fuel injection devices, which include a reduction in engine noise and vibration, while also avoiding the occurrence of fuel injection amounts that are either too large or too little so as to obtain a desired engine output, and it is possible to achieve a reduction in the amount of harmful substances that are discharged.

It should be noted that in a specific example of the fuel injection operation of this multiple-injection type pressure accumulation-type fuel injection device, a pilot injection and a main injection serve as the plural number of fuel injection operations that are performed by the fuel injection valve in a single cycle of the engine. By properly performing the pilot injection in advance of the main injection it is possible to not only reduce the amount of NOx that is generated by controlling ignition lag at the time of the main injection and to reduce the combustion noise and vibration, but also the startability and the fuel economy can be improved.

Further, in this multiple-injection type pressure accumulation-type fuel injection device, it is also possible for correction of the second and subsequent common rail pressures that accompany the plural number of fuel injection operations in a single cycle of the engine to be performed according to the fluid properties of the fuel and the geometric data of the common rail.

In addition, the scope of the technical idea of the invention also includes an internal combustion engine that is furnished with any one of the pressure accumulation-type fuel injection devices set forth above as a means for solution.

EFFECTS OF THE INVENTION

As illustrated above, with the present invention, the common rail pressure at the actual fuel injection start time is detected and the fuel injection duration (fuel injection end time) is calculated based on this detected value, so that it is possible to obtain a fuel injection duration that is suited for the actual common rail pressure at the fuel injection start time. Thus, a desired engine output can be obtained without too much or too little fuel injection, and it is possible to achieve a reduction in the amount of harmful substances that are discharged.

In particular, in multiple-injection type pressure accumulation-type fuel injection devices, the fuel injection amount in each injection stage can be correctly obtained and it is possible to reduce the amount of NOx that is produced, lower the combustion noise and vibration, and improve the startability and the fuel efficiency.

Figure 1:
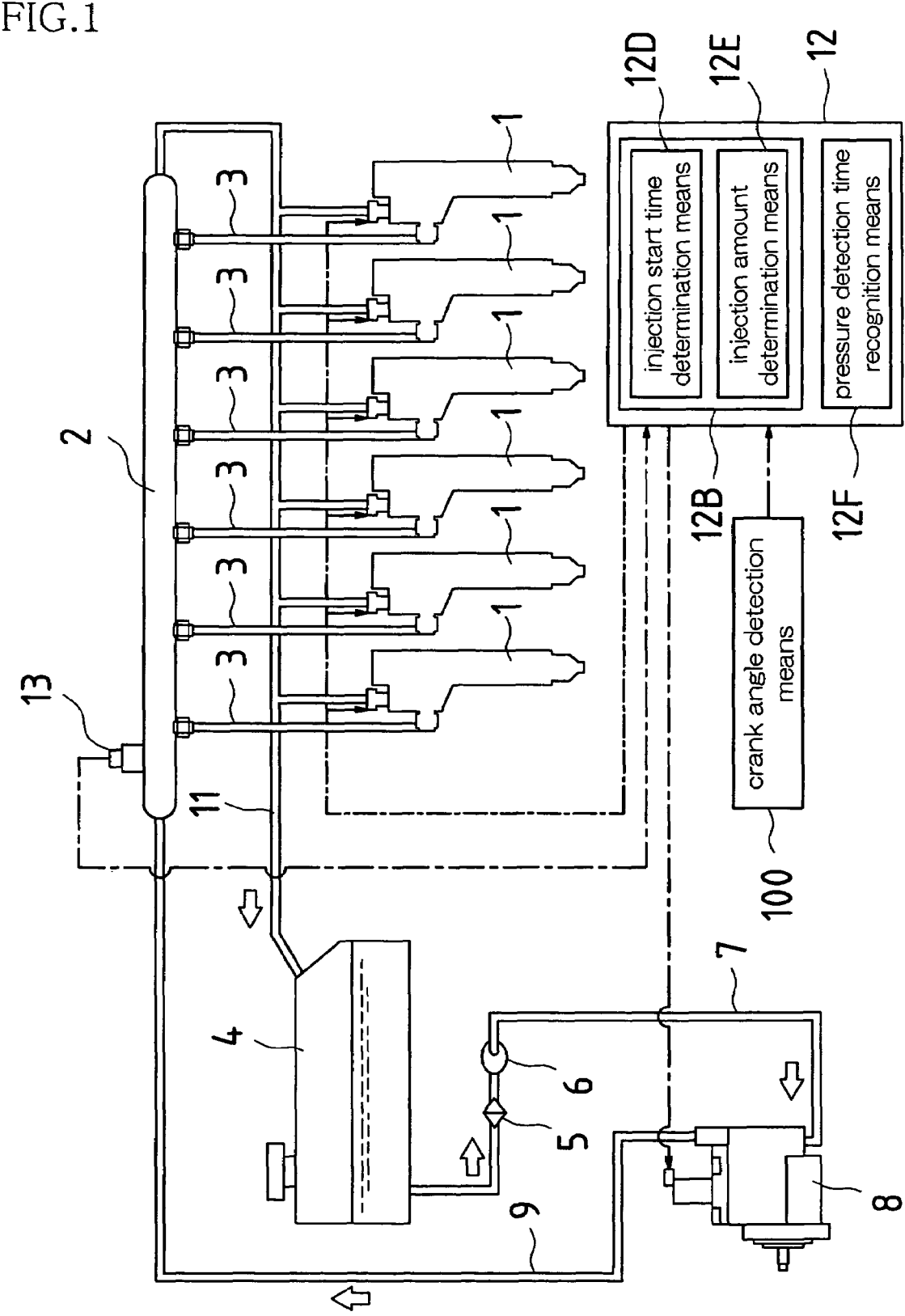
FIG. 1 is a diagram showing the pressure accumulation-type fuel injection device according to an embodiment.

DESCRIPTION OF REFERENCE NUMERALS 1 injector (fuel injection valve)
2 common rail
8 high-pressure pump (fuel pump)
12B injection duration computation means (injection duration calculation means)
12D injection start time determination means
12E injection amount determination means
12F pressure detection time recognition means
13 pressure sensor (pressure detection means)

BEST MODE FOR CARRYING OUT THE INVENTION

Embodiments of the present invention will now be described with reference to the drawings. The following embodiments describe cases in which the present invention has been adopted for a pressure accumulation-type fuel injection device that is provided in the fuel supply system of a six-cylinder marine diesel engine.

First Embodiment

First, a first embodiment is described. This embodiment illustrates a case in which the invention has been applied to a pressure accumulation-type fuel injection device that performs a fuel injection operation only once (main injection only) for the same cylinder in one cycle of the engine.

—Description of the Accumulating Fuel Injection Apparatus—

Figure 13:
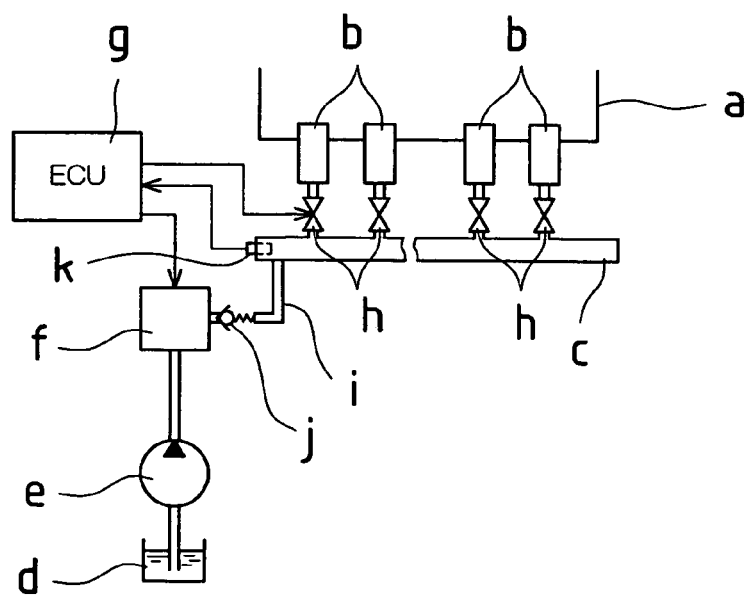
FIG. 13 is a diagram showing a schematic of the entire structure of the fuel supply system of a multiple cylinder diesel engine furnished with a conventional pressure accumulation-type fuel injection device.
Figure 14:
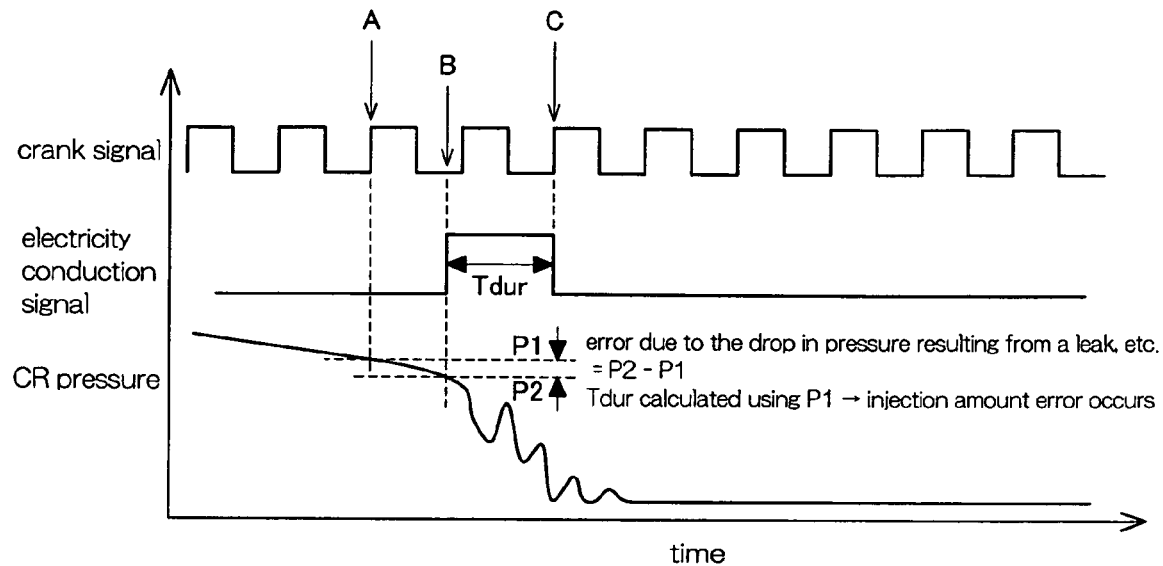
FIG. 14 is a diagram that corresponds to FIG. 10 for the conventional example.
Figure 15:
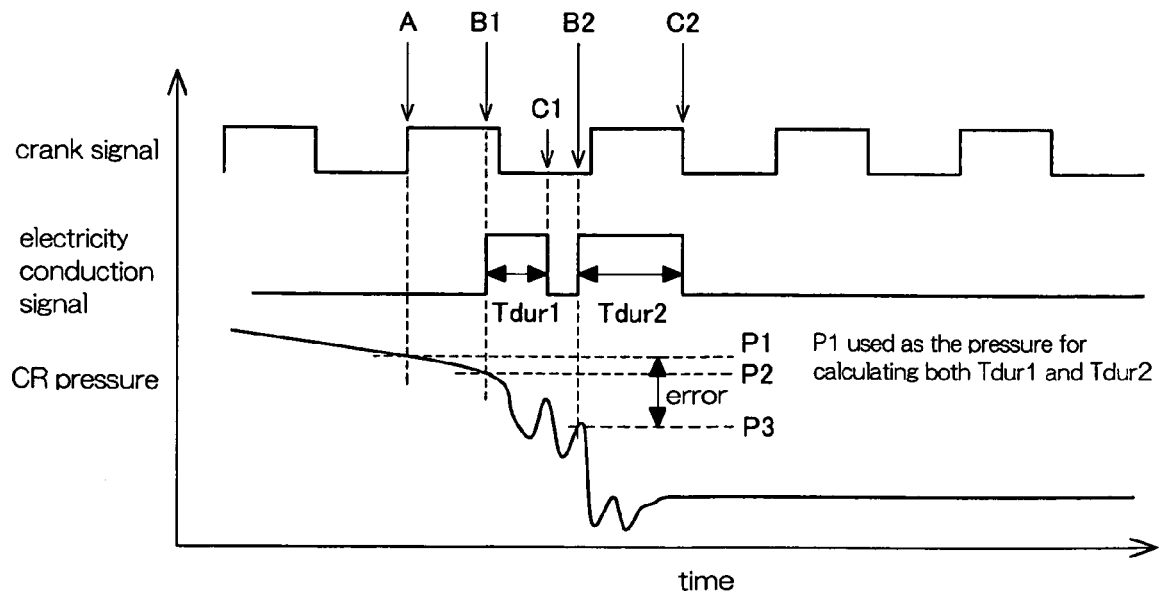
FIG. 15 is a diagram that corresponds to FIG. 11 for a conventional example.

The overall configuration of the pressure accumulation-type fuel injection device is described first. FIG. 1 shows a pressure accumulation-type fuel injection device that is provided in a six-cylinder marine diesel engine. The devices making up the pressure accumulation-type fuel injection device shown in this drawing are substantially identical to those of the pressure accumulation-type fuel injection device that was described using FIG. 13, and thus here will not be described in detail.

First, the supply of fuel to each injector (fuel injection valve) 1 is performed through a branched pipe 3 that constitutes a portion of the fuel channel from a common rail 2. The fuel is taken from a fuel tank 4 through a filter 5 by a feed pump (the low-pressure pump mentioned above) 6 and pressurized to a predetermined intake pressure and then delivered to a high-pressure pump (fuel pump) 8 through a fuel pipe 7. The high-pressure pump 8 is, for example, driven by the engine and is a so-called plunger-type supply fuel supply pump that pressurizes the fuel to a high pressure that is determined based on the operating state, for example, and supplies this to the common rail 2 through a fuel line 9.

The fuel that has been supplied to the high-pressure pump 8 is collected in the common rail 2 still pressurized to the predetermined pressure, and from the common rail 2 is supplied to each injector 1. A plurality of injectors 1 are provided according to the engine type (number of cylinders; in this embodiment, six cylinders), and under the control of a controller 12, the injectors 1 inject the fuel that has been supplied from the common rail 2 to the corresponding combustion chamber at an optimum injection timing over an optimum fuel injection duration (the method for determining the injection timing and the fuel injection duration is discussed later). The injection pressure at which the fuel is injected from the injectors 1 is substantially equal to the pressure of the fuel being held in the common rail 2, so that controlling the pressure within the common rail 2 results in control of the fuel injection pressure.

Fuel that is supplied to the injectors 1 from the branched pipe 3 but is not used up in the injection to the combustion chamber is returned to the fuel tank 4 through a return pipe 11.

The controller 12, which is an electric control unit, is supplied with information on the cylinder number and the crank angle (the operation for obtaining information on the cylinder number and the crank angle is discussed later).

The controller 12 stores as functions the target fuel injection conditions (for example, the target fuel injection timing, the target fuel injection amount, and the target common rail pressure), which are determined in advance based on the engine operating state so that the engine output becomes the optimum output for the operating state, and computes the target fuel injection conditions (that is, the fuel injection timing and the injection duration for the injector 1) in correspondence with signals that indicate the current engine operating state, which is detected by various sensors, and then controls the operation of the injectors 1 and the fuel pressure within the common rail so that fuel injection is performed under those conditions.

Figure 2:
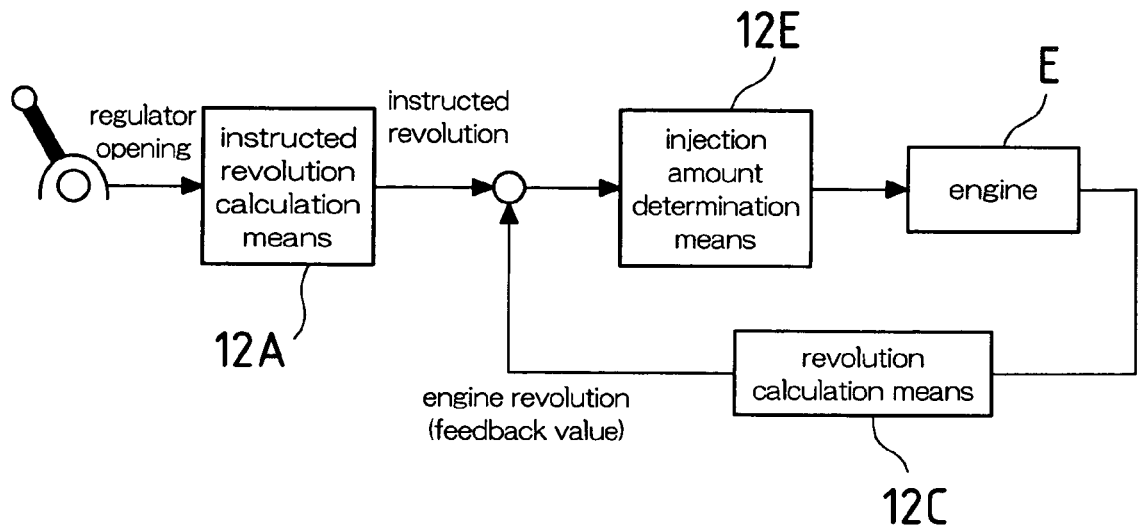
FIG. 2 is a control block diagram for determining the fuel injection amount.

FIG. 2 is a control block diagram of the controller 12 for determining the fuel injection amount that serves as the basis for calculating the fuel injection duration. As shown in FIG. 2, instructed revolution calculation means 12A receives a signal that indicates the degree of opening of the regulator that is actuated by the user, and the instructed revolution calculation means 12A then calculates the "instructed revolution (target revolution)" that corresponds to the degree of opening of the regulator. Then, injection amount determination means 12E calculates the fuel injection amount so that the engine revolution becomes this instructed revolution. The injectors 1 of the engine E continue the fuel injection operation so that the fuel injection amount that has been found through this computation is achieved, and in this state a revolution calculation means 12C calculates the actual engine revolution and compares this actual engine revolution with the instructed revolution and corrects the fuel injection amount (feedback correction) so that the actual engine revolution approaches the instructed revolution.

The common rail 2 is provided with a pressure sensor (pressure detection means) 13 that detects the pressure within the common rail 2 and sends a detection signal thereof to the controller 12. The transmission timing at which the pressure sensor 13 sends the detection signal to the controller 12 is discussed later.

The injection of fuel from the injectors 1 consumes fuel within the common rail 2, but the controller 12 controls the ejection amount of the high-pressure pump 8 so that the fuel pressure within the common rail 2 stays constant.

The fuel injection duration is stored in the controller 12 as a function whose variables are the fuel injection amount and the common rail pressure at the injection timing. The fuel injection duration thus can be calculated based on this function as long as the fuel injection amount has been determined and the common rail pressure at the injection timing has been detected.

In this way, the configuration of the pressure accumulation-type fuel injection device is such that it accumulates the ejection fuel that is sent under pressure from the high-pressure pump 8 in the common rail 2 and drives the injectors 1 to inject fuel at a fuel injection timing (fuel injection period) and a fuel injection duration that are suited for the operating state of the engine. As for controlling the common rail pressure, the high-pressure pump 8 is controlled according to the fuel injection from the injectors 1 so as to deliver the fuel under pressure, and by controlling the amount of fuel that is sent under pressure, the common rail pressure is kept constant so that it does not drop.

—Crank Angle Detection Means—

Next, the constitution of the crank angle detection means for sending crank angle information and cylinder number information to the controller 12 is described. In this embodiment, the crank angle detection means has both a crank angle detection function and a cylinder number discrimination function.

Figure 3:
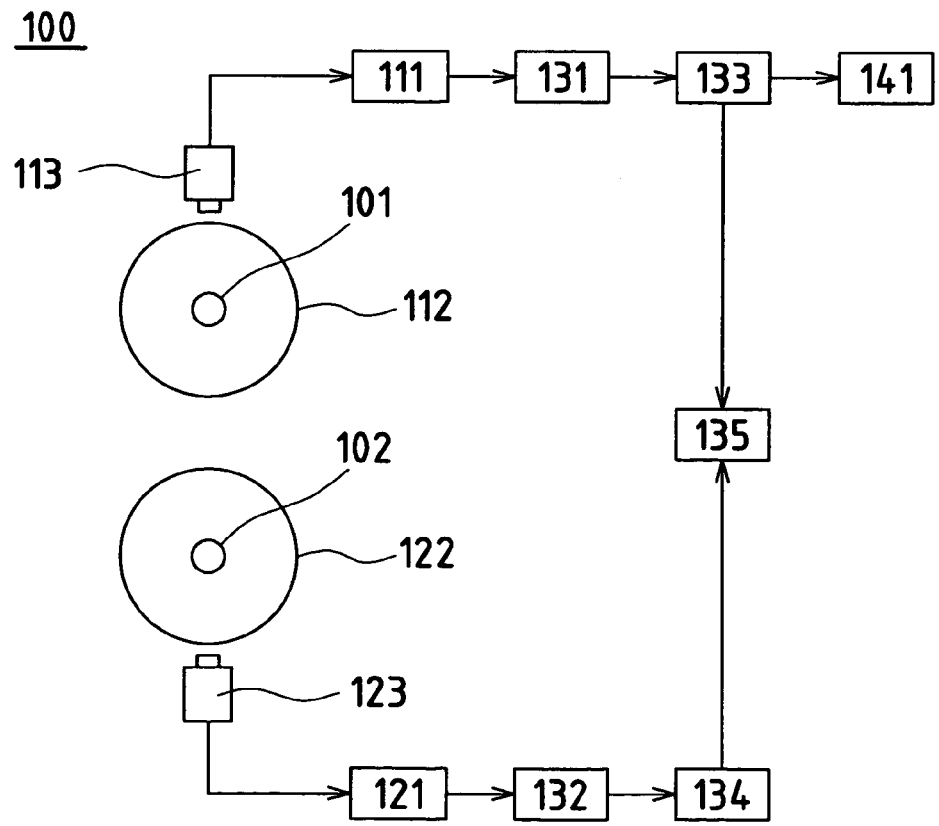
FIG. 3 is a block diagram showing an overview of the configuration of the crank angle detection means.
Figure 4:
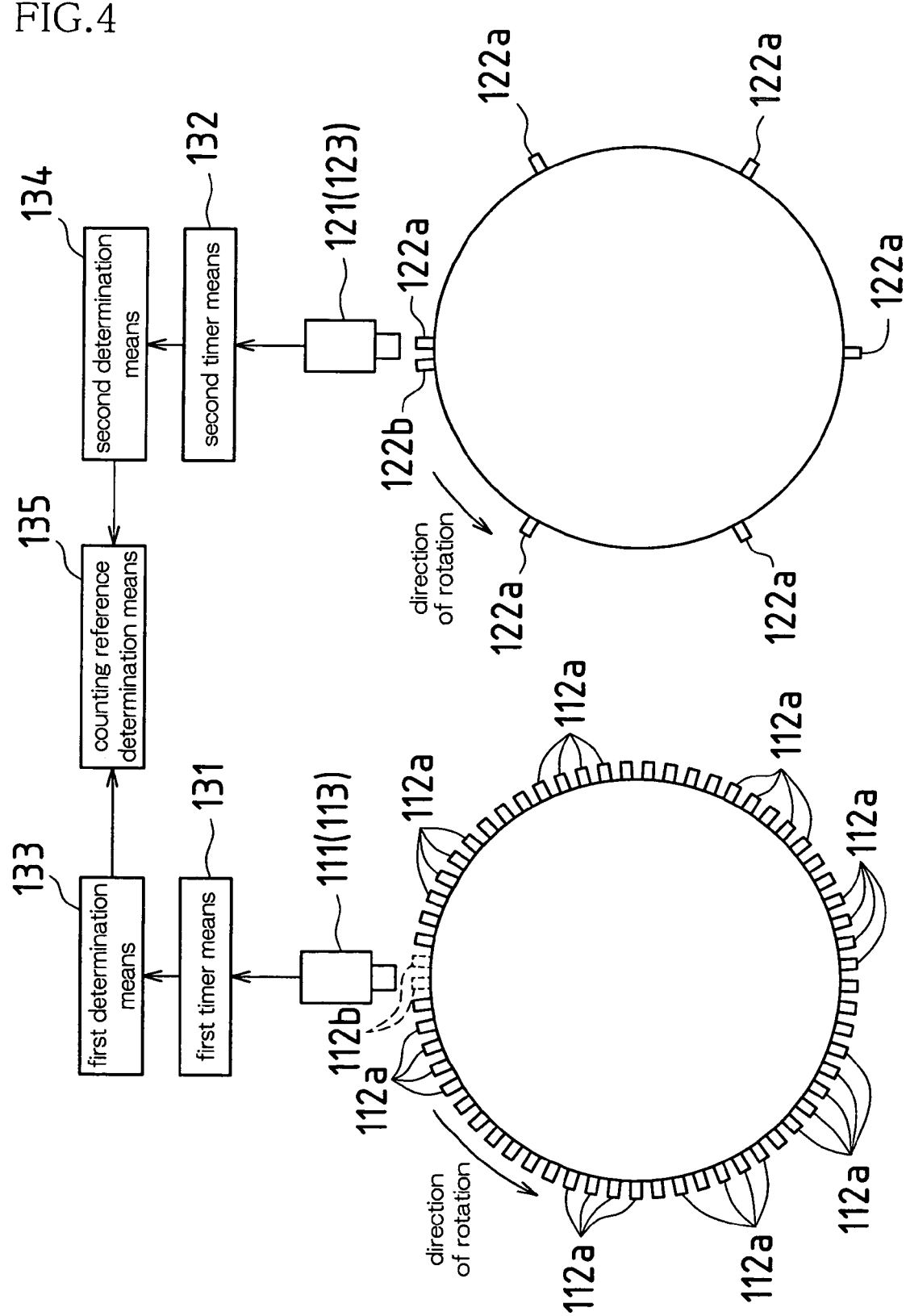
FIG. 4 is a diagram of the basic configuration of the crank angle detection means that schematically shows the first and the second detection means.

FIG. 3 is a function block diagram that shows the overall configuration of a crank angle detection means 100. FIG. 4 is a configuration diagram that schematically shows the first and the second detection means of FIG. 3.

In FIG. 3 and FIG. 4, reference number 101 denotes the engine crank shaft, 102 denotes a cam shaft for the suction and exhaust valve that is rotated in synchronization with the crank shaft 101 at one half the velocity by a mechanism that is not shown.

The crank shaft 101 is furnished with first signal detection means 111 for obtaining a detection signal every first predetermined angle, and a detection signal every second predetermined angle, of the rotation of the crank shaft 101. The first signal detection means 111 is provided with a crank shaft synchronized rotating member 112 that is rotatably linked to and rotates in synchronization with the crank shaft 101, a plurality of projections 112a that are provided once every predetermined angle along the outer circumference of the crank shaft synchronized rotating member 112, and a first electromagnetic pickup-type detector 113.

Figure 5:
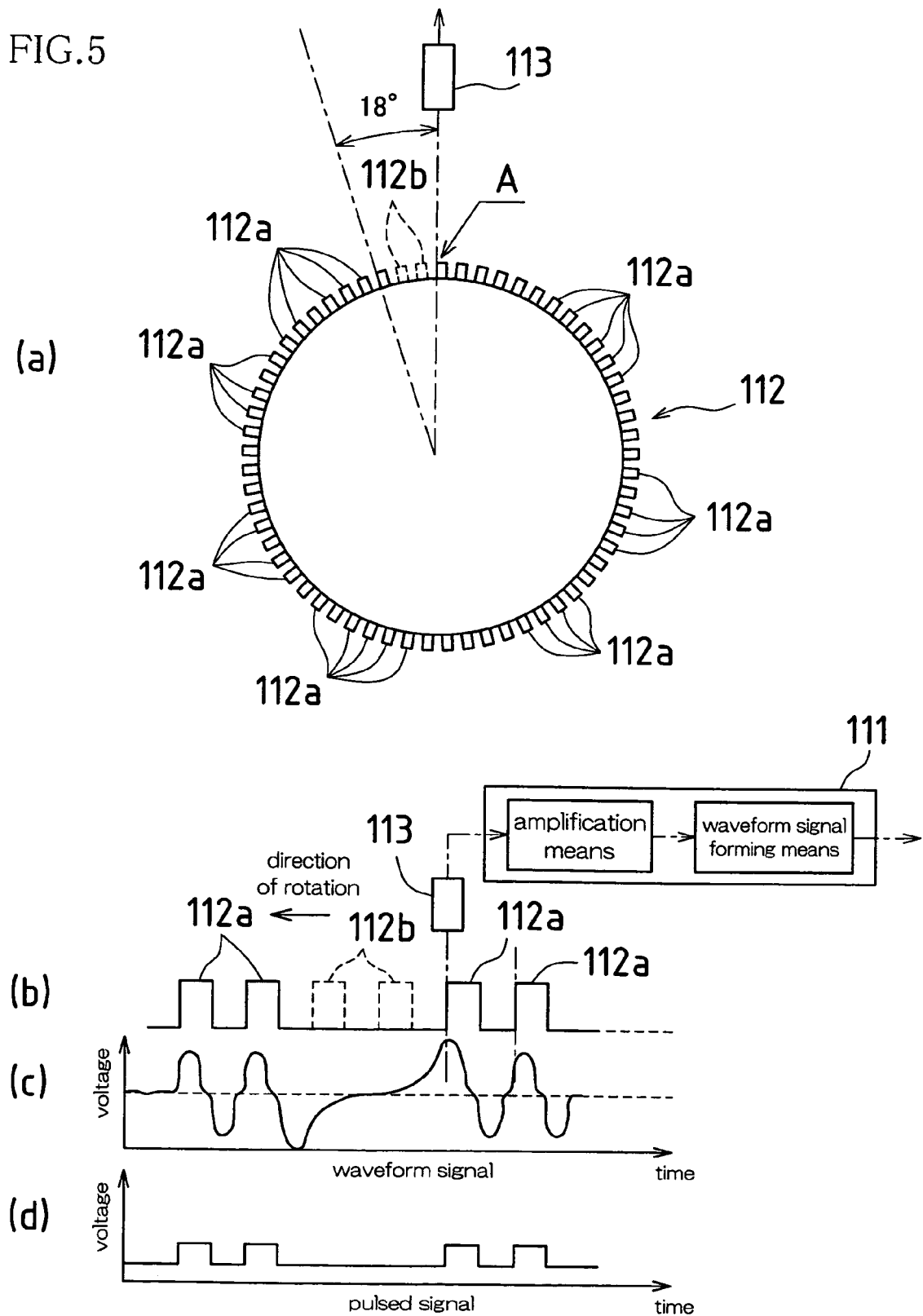
FIG. 5(a) is an explanatory diagram showing the reference position of the crank angle for the first detection means.
FIG. 5(b) is an expansion of the projections of crank shaft synchronized rotating member.
FIG. 5(c) is a diagram that shows the waveform signal formed by amplifying the electromagnetic pickup output signal that is detected by the first detector.
FIG. 5(d) is a diagram that shows the rectangular wave pulsed signal that is obtained by transforming the waveform signal.

The projections 112a of the crank shaft synchronized rotating member 112 are provided between adjacent projections 112a projecting radially outward every crank angle of 6° with a tiny gap therebetween that substantially matches the width in the circumferential direction of each projection 112a, and two adjacent projections 112a are missing before the reference position A of the crank angle (see FIG. 5). Thus, when those two missing projections 112b are subtracted from the projections 112a that are provided every crank angle of 6° in the circumferential direction of the crank shaft synchronized rotating member 112, a total of 58 projections are provided. The detection signal every first predetermined angle is a detection signal at the short interval of every crank angle of 6° and is output each time that a projection 112a is detected in the circumferential direction of the crank shaft synchronized rotating member 112, and this detection signal is detected 58 times as the crank shaft synchronized rotating member 112 turns one revolution. On the other hand, the detection signal every second predetermined angle is a detection signal with a long interval therebetween that occurs when the two missing projections 112b next to one another in the circumferential direction of the crank shaft synchronized rotating member 112 are detected, and is detected only once as the crank shaft synchronized rotating member 112 turns one revolution.

The cam shaft 102 is furnished with second signal detection means 121 for obtaining a detection signal every third predetermined angle, and a detection signal every fourth predetermined angle, of the rotation of the cam shaft 102. The second signal detection means 121 is provided with a cam shaft synchronized rotating member 122 that is linked to one end of the cam shaft 102 so that the two rotate as a single unit and in synchronization with one another, a plurality of projections 122a that are provided every predetermined angle along the outer circumference of the cam shaft synchronized rotating member 122, and a second electromagnetic pickup-type detector 123.

Figure 6:
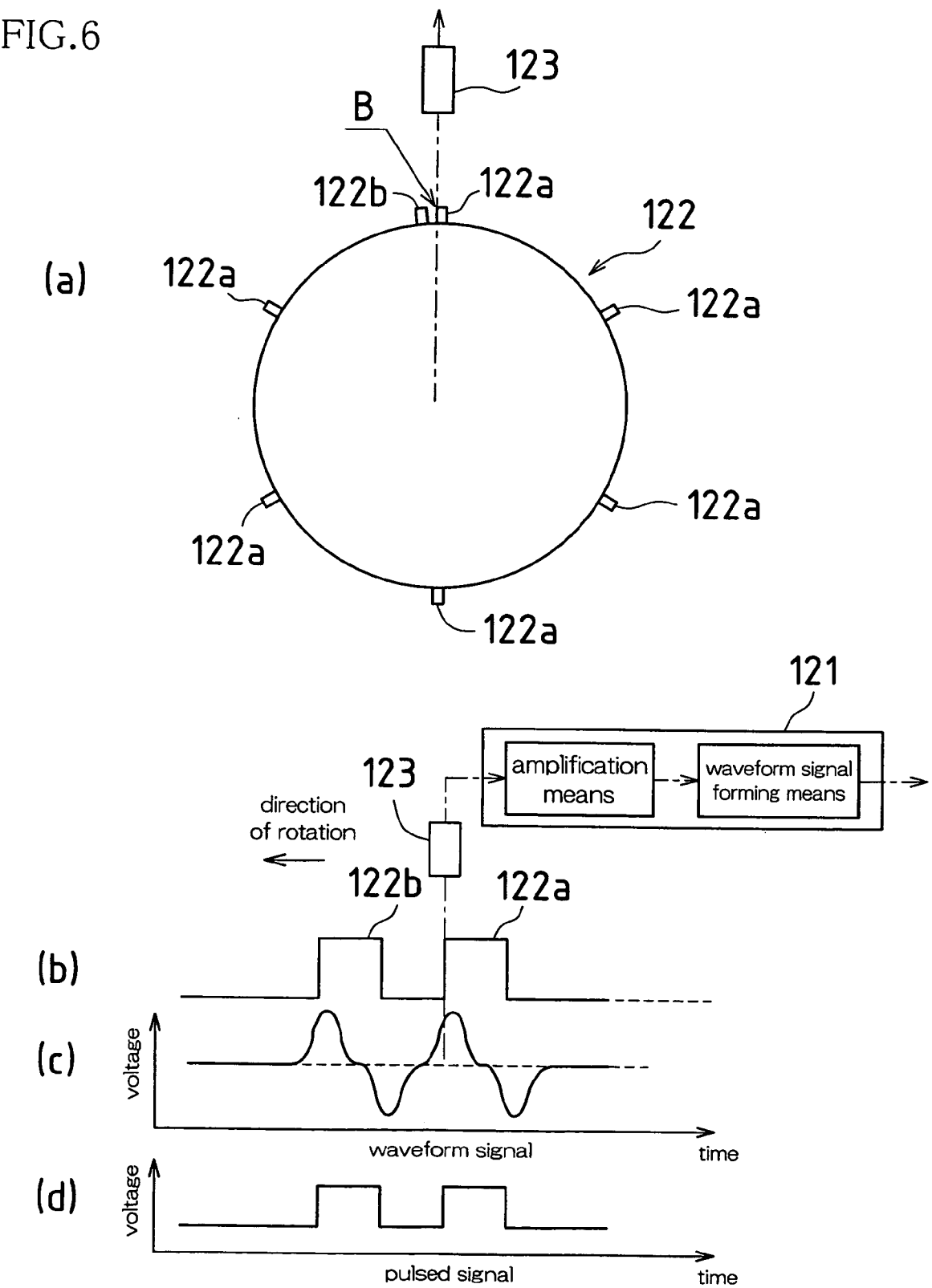
FIG. 6(a) is an explanatory diagram showing the reference position of the cam angle for the second detection means.
FIG. 6(b) is an expansion of the projections of cam shaft synchronized rotating member.
FIG. 6(c) is a diagram that shows the waveform signal formed by amplifying the electromagnetic pickup output signal that is detected by the second detector.
FIG. 6(d) is a diagram that shows the rectangular wave pulsed signal that is obtained by transforming the waveform signal.

The projections 122a of the cam shaft synchronized rotating member 122 are provided projecting radially outward at positions that substantially correspond to every cam angle of 60° in the circumferential direction of the cam shaft synchronized rotating member 122. A single projection 122b is provided at a position that is in front of the cam angle reference position B (see FIG. 6), and more specifically, at a forward position that is away from the projection 122a of the cam degree reference position B by a cam angle of 6°. Here, six projections 122a corresponding to the six cylinders of the engine are provided projecting outward in the circumferential direction of the cam shaft synchronized rotating member 122.

The detection signal every third predetermined angle is a cylinder detection signal at a constant spacing that corresponds to each cylinder and is output each time a projection 122a is detected in the circumferential direction of the cam shaft synchronized rotating member 122, and this signal is detected six times as the cam shaft synchronized rotating member 122 turns one revolution. On the other hand, the detection signal every fourth predetermined angle is a W-pulse specific detection signal at a short interval and detected twice consecutively due to the projection 122a of the cam degree reference position B and the single projection 122b that is provided before that projection 122a, and is detected only once (W pulse) as the cam shaft synchronized rotating member 122 turns one revolution. In this case, as shown in FIGS. 5(a) and 5(b), which is an expansion of FIG. 5(a), and FIGS. 6(a) and 6(b), which is an expansion of FIG. 6(a), the detection signal (electromagnetic pickup output signal) that is detected by the first and second detectors 113 and 123 is amplified by amplification means of the signal detection means 111 or 121 and then converted to a rectangular waveform pulsed signal by waveform signal forming means. FIGS. 5(c) and 6(c) and FIGS. 5(d) and 6(d) show the output of the amplification means and the waveform signal forming means, respectively. These pulsed signals correspond to the projections 112a, 122a, and 122b.

In FIG. 3, reference numeral 131 denotes first timer means serving as first measurement means, and the first timer means 131 receives the output from the first detector 113 and measures the interval between generation of the first and second detection signals obtained based on the crank shaft synchronized rotating member 112.

Reference numeral 132 denotes second timer means serving as second measurement means, and the second timer means 132 receives the output from the second detector 123 and measures the interval between generation of the third and fourth detection signals obtained based on the cam shaft synchronized rotating member 122.

Figure 7:
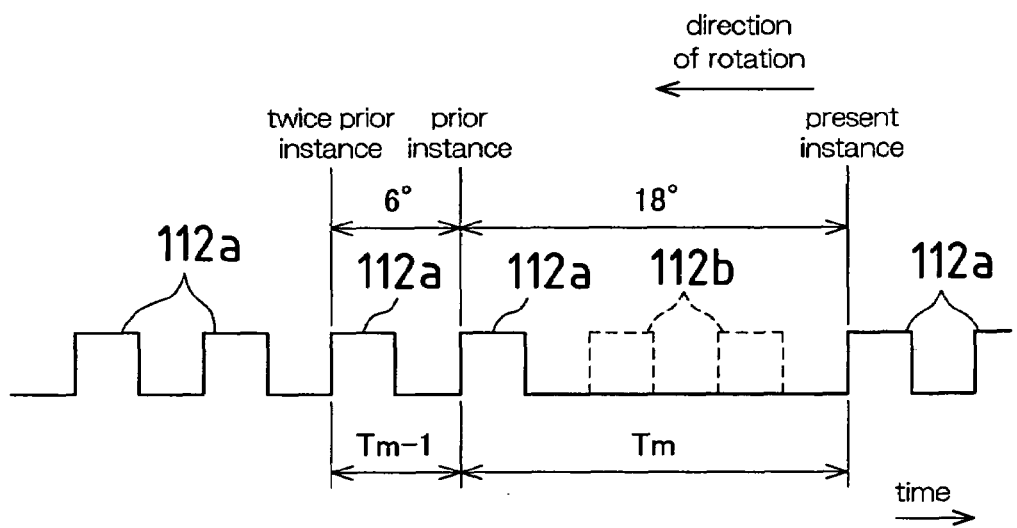
FIG. 7 is a pulsed signal waveform diagram that describes the grounds on which the first determination means determines the first and the second detection signals.

Reference numeral 133 denotes first determination means that receives output from the first timer means 131 and, as shown in FIG. 7, compares the interval between generation of the current and the previous detection signal measured by the first timer means 131, that is, a generation time interval $T_m$ of the two signals for adjacent projections 112a, and a the interval between generation of the prior detection signal and the twice prior detection signal, that is, the generation time interval $T_{m-1}$ of the detection signals for the previous adjacent projections 112a, and determines whether the detection signal that has been measured by the first timer means 131 is the detection signal that occurs every first predetermined angle (the detection signal every 6° of the crank angle) or the detection signal that occurs every second predetermined angle (the specific detection signal that detects the single occurrence of missing projections 112b once per revolution). Here, if the first determination means 133 compares the generation time interval $T_m$ of the detection signal that is measured by the first timer means 131 and the generation time interval $T_{m-1}$ of the detection signal one prior and the result satisfies the relationship $2 \leq T_m/T_{m-1} \leq 4$, then it determines that the current detection signal is the detection signal that occurs every second predetermined angle (specific detection signal resulting from the missing projections 112b). The values 2 and 4 that define the range of $T_m/T_{m-1}$ are constants that can be changed depending on engine operating state such as the engine load, immediately after startup, and during acceleration and deceleration, for example.

Figure 8:
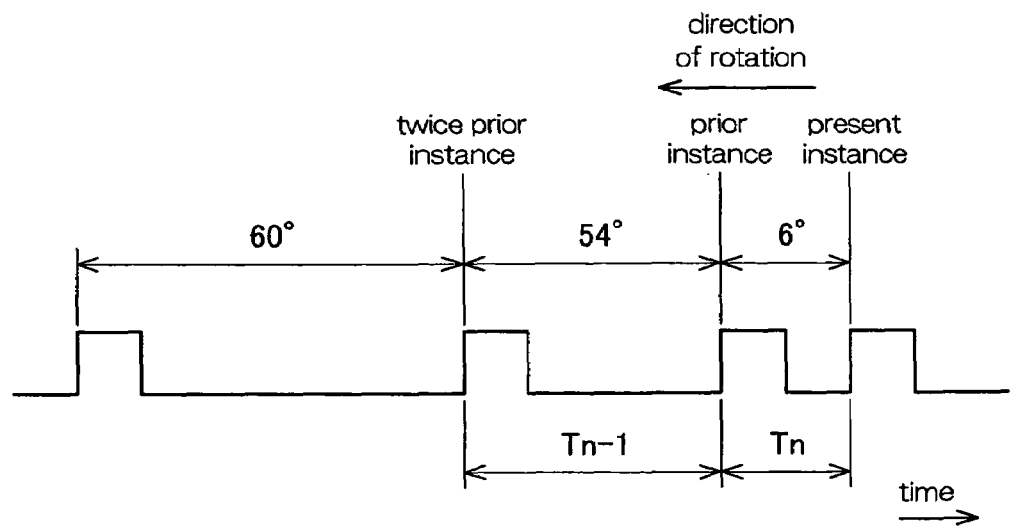
FIG. 8 is a pulsed signal waveform diagram that describes the grounds on which the second determination means determines the third and the fourth detection signals.

On the other hand, reference numeral 134 denotes second determination means that receives output from the second timer means 132 and, as shown in FIG. 8, compares a generation time interval between the current and the previous detection signal measured by the second timer means 132, that is, a generation time interval $T_n$ of the two signals for adjacent projections 122a, and a generation time interval between the prior detection signal and the twice prior detection signal, that is, the generation time interval $T_{n-1}$ of the detection signals for the previous adjacent projections 122a, and determines whether the detection signal that has been measured by the second timer means 132 is the detection signal that occurs every third predetermined angle (cylinder detection signal corresponding to each cylinder) or the detection signal that occurs every fourth predetermined angle (a single W-pulse specific detection signal once per revolution). Here, if the second determination means 134 compares the generation time interval $T_n$ of the detection signal that has been measured by the second timer means 132 and the generation time interval $T_{n-1}$ of the detection signal one prior and the result satisfies the relationship $0.1 \leq T_n/T_{n-1} \leq 0.5$, then it determines that the current detection signal is the detection signal that occurs every fourth predetermined angle (W-pulse specific detection signal). The values 0.1 and 0.5 that define the range of $T_n/T_{n-1}$ are constants that can be changed depending on engine operating state such as the engine load, immediately after startup, and during acceleration and deceleration, for example.

Figure 9:
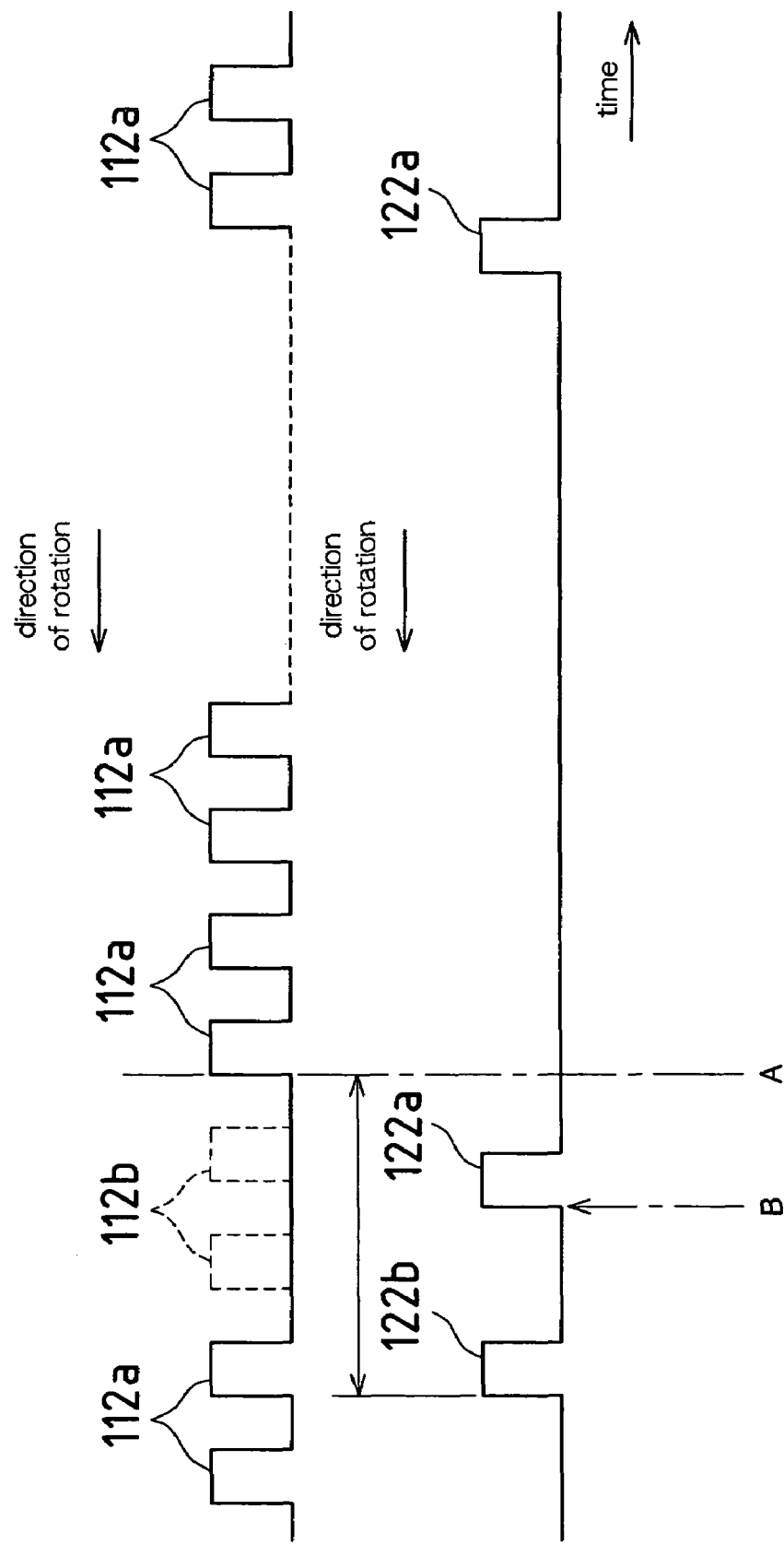
FIG. 9 is a pulsed signal waveform diagram that describes the grounds on which the counting reference determination means determines the counting reference for the crank angle.

Reference numeral 135 denotes counting reference determination means. The counting reference determination means 135 receives the output from the first determination means 133 and the second determination means 134, and as shown in FIG. 9, when the first determination means 133 determines that the detection signal is the detection signal every second predetermined angle (the single specific detection signal once per revolution) and the second determination means 134 determines that the detection signal is the detection signal every fourth predetermined angle (the W-pulse specific detection signal) within a predetermined angle (for example, within 30°) of the crank shaft synchronized rotating member 112, then the point where the first detection signal initially measured by the first timer means 131 is generated is determined to be the counting reference A of the crank angle (reference position A for the crank angle). In this case, the crank angle counting reference A (reference position A for the crank angle) is defined by the rising edge position of the pulsed signal (projection 112a) in the rotation direction of the crank shaft synchronized rotating member 112, as shown in FIG. 5(a). On the other hand, as shown FIG. 6(a), the reference position B of the cam angle is defined by the rising edge position of the pulsed signal (projection 122a) in the rotation direction of the cam shaft synchronized rotating member 122.

In FIG. 3, reference numeral 141 denotes counting means that receives the output from the first determination means 133, and each time that the first detection signal is generated based on the crank shaft synchronized rotating member 112 the counting means 141 counts that signal generation number. The counting means 141 is reset when the number of times that the first detection signal has been generated based on the crank shaft synchronized rotating member 112 reaches a predetermined value. The predetermined value at which the counting means 141 is reset is the point at which the number of first detection signals generated based on the crank shaft synchronized rotating member 112 reaches the value corresponding to one revolution of a single cylinder (=360°×2 revolutions/6°/6 cylinders), that is, when it reaches the number 20.

It should be noted that in the case corresponding to the cylinder revolution that coincides with the two missing projections 112b, the counting means 141 is reset at the point that the counted number is 18, which is two pulses fewer. Each time the counting means 141 is reset it sequentially updates the cylinder number (1→2→3→4→5→6→1 etc.). That is, the cylinder number that is recognized at the point that the signal generation number of the detection signal based on the crank shaft synchronized rotating member 112 reaches 20 or 18 is updated.

The above configuration allows crank angle information and cylinder number information to be obtained and these two types of information are sent to the controller 12.

—Method for Calculating the Fuel Injection Timing and the Fuel Injection Duration—

Next, the method for calculating the fuel injection timing and the fuel injection duration, which is one aspect characteristic of the invention, is described. As shown in FIG. 1, injection duration computation means (injection duration calculation means) 12B of the controller 12 is provided with injection start time determination means 12D and the injection amount determination means 12E, and stores an injection duration calculation function whose variables are the injection amount and the common rail pressure.

The injection start time determination means 12D determines the fuel injection start time of the injectors 1 based on the engine operating state such as the engine revolution and the engine load.

The injection amount determination means 12E, as mentioned earlier, receives a discrepancy signal on the difference between a target revolution signal based on the opening signal of the regulator and the actual engine revolution signal, which is a feedback signal, and from this determines the fuel injection amount.

At the fuel injection start time the pressure sensor 13 detects the common rail pressure and sends this detection signal to the injection duration computation means 12B.

When the pressure sensor 13 has detected the pressure within the common rail, the injection duration computation means 12B receives the detection signal of common rail pressure from the pressure sensor 13 and then calculates the fuel injection duration based on this common rail pressure and the fuel injection amount that has been determined by the injection amount determination means 12E. Specifically, the injection duration computation means 12B calculates the fuel injection duration (time from the start of fuel injection until the end of fuel injection) based on the injection duration calculation function, and starts this calculation operation substantially simultaneous to the detection operation by the pressure sensor 13 of detecting the common rail pressure. Thus the fuel injection duration is calculated, and the injectors 1 perform the fuel injection operation from the fuel injection start time that has been determined by the injection start time determination means 12D. This fuel injection operation is ended at the point that the fuel injection duration that has been calculated by the injection duration computations means 12B has elapsed.

Figure 10:
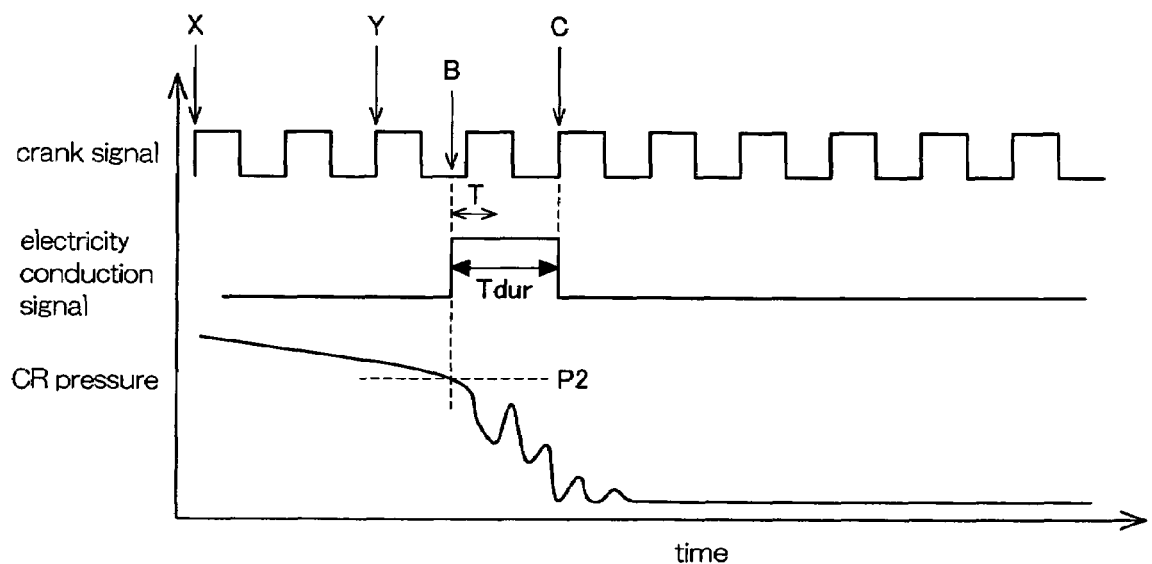
FIG. 10 is a diagram that shows the change in the crank signal, the electricity conduction signal to the injector, and the common rail pressure, at the fuel injection timing in the first embodiment.

FIG. 10 shows the change in the crank signal, the electricity conduction signal to the injection control solenoid valve of the injector 1, and the common rail pressure, at the timing at which the fuel is injected from a certain injector 1 (for example, the injector of the first cylinder). Here, as above, the crank signal is a pulsed waveform that is transmitted every 6° of rotation of the crank. The operation of injecting fuel from the injector 1 is performed while the electricity conduction signal to the injection control solenoid valve is ON.

First, the fuel injection start timing is calculated by the injection start time determination means 12D based on various engine information such as the engine revolution and the engine load. In the case shown in FIG. 10, the supply of electricity to the injection control solenoid valve is started at the timing point B to start the injection of fuel from the injector 1. Specifically, if the point X in the drawing is the point at which the crank angle is 0°, and the timing at which to supply electricity to the injection control solenoid valve based on various engine information such as the engine revolution and the engine load has been set to the point where the crank angle is 17° (the timing point B in the drawing), then two pulse waves are counted after recognizing that the crank angle is 0° due to the signal from the crank angle detection means 100, and the point that the crank angle has advanced by 5° after the second pulse wave has fallen (after 6°×2=12° has elapsed, that is, after passing point Y in FIG. 10) is taken as the timing for the supply of electricity to the injection control solenoid valve. It is recognized that the crank angle has advanced by 5° by calculations based on the engine revolution (crank shaft revolution speed).

The operation for calculating the fuel injection duration is explained next. The pressure sensor 13 detects the common rail pressure at the same time (at the timing B) that the supply of electricity to the injection control solenoid valve is started. When detection of the common rail pressure has been performed, the injection duration computation means 12B receives the common rail pressure detection signal from the pressure sensor 13, and based on this common rail pressure and the fuel injection amount that has been determined in advance by the injection amount determination means 12E according to the engine operating state, starts the operation for calculating the fuel injection duration. That is, at substantially the same time that fuel injection is started the calculation of the fuel injection duration (the time from the start of the fuel injection to the end of fuel injection) is started. In the case shown by FIG. 10, T is the time that has been calculated as the fuel injection duration. Due to this calculation, Tdur is found as the fuel injection duration and the supply of electricity to the injection control solenoid valve is stopped at the timing C to end fuel injection.

In this way, with this embodiment it is possible to calculate the fuel injection duration based on the actual common rail pressure at the moment that fuel injection is started, and thus it is possible to obtain a fuel injection duration that is suited for the actual common rail pressure at the moment that fuel injection is started. The result is that the desired engine output can be obtained without too much or too little fuel injection, and it is possible to achieve a reduction in harmful substances that are discharged.

Second Embodiment

A second embodiment is described next. This embodiment is described with respect to a case where the present invention has been applied to a pressure accumulation-type fuel injection device that performs the fuel injection operation twice (pilot injection and main injection) for the same cylinder during the one cycle of the engine. It should be noted that the overall configuration of the engine is substantially the same as that according to the first embodiment, and thus here only those areas that are different from the first embodiment are discussed.

The injection start time determination means 12D of this embodiment determines the fuel injection start time of the injectors 1 for both the pilot injection and the main injection, according to engine operating state such as the engine revolution and the engine load.

At the fuel injection start time for the pilot injection and the main injection, the pressure sensor 13 detects the common rail pressure and sends that detection signal to the injection duration computation means 12B.

The injection duration computation means 12B receives this common rail pressure detection signal each time that the pressure sensor 13 detects the common rail pressure (each fuel injection start time for the pilot injection and the main injection), and based on this common rail pressure and the fuel injection amount that has been determined in advance by the injection amount determination means 12E according to engine operating state, calculates the fuel injection duration. Specifically, the injection duration computation means 12B calculates the fuel injection duration (the time from the start of fuel injection to the end of fuel injection) for both the pilot injection and the main injection based on the above injection duration calculation function, and starts this calculation operation substantially simultaneous to the operation by the pressure sensor 13 for detecting the common rail pressure. In this way, the fuel injection duration is calculated for both the pilot injection and the main injection, and the injectors 1 perform the fuel injection operation from the fuel injection start time that has been determined by the injection start time determination means 12D, and this fuel injection operation is ended at the point that the fuel injection duration of that injection operation, which has been calculated by the injection duration computation means 12B, has elapsed.

Figure 11:
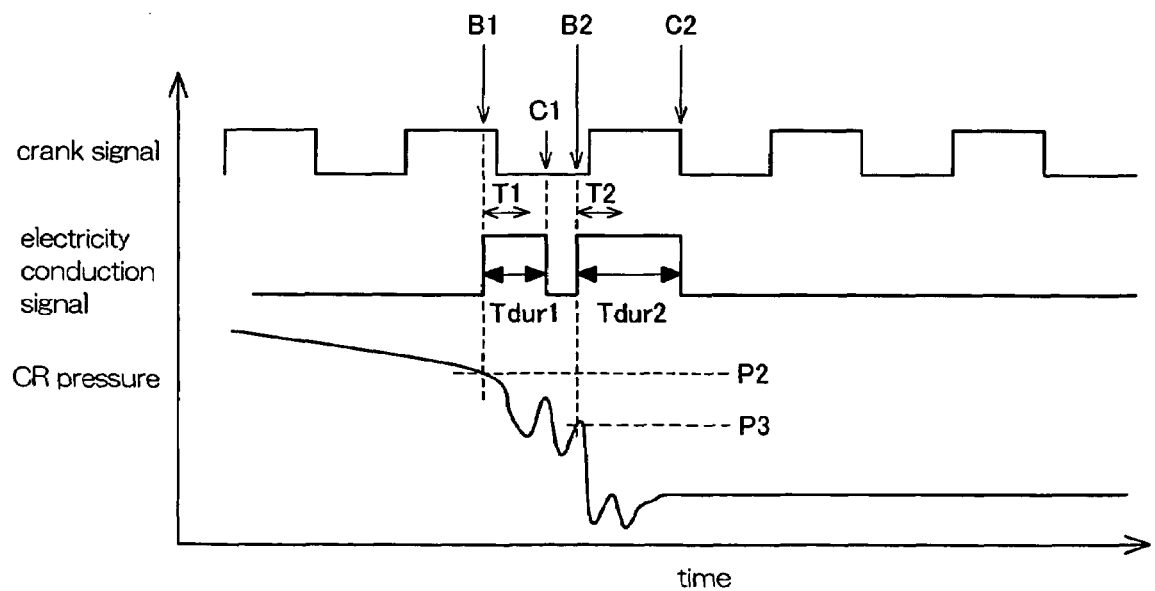
FIG. 11 is a diagram that shows the change in the crank signal, the electricity conduction signal to the injector, and the common rail pressure, at the fuel injection timing in the second embodiment.

FIG. 11 shows the change in the crank signal, the electricity conduction signal to the injection control solenoid valve of the injector 1, and the common rail pressure, at the point in time that the fuel is injected from a certain injector 1 (for example, the injector of the first cylinder).

First, the fuel injection start timing is calculated by the injection start time determination means 12D based on various engine information such as the engine revolution and the engine load. In the case shown in FIG. 11, the supply of electricity to the injection control solenoid valve is started at the timing B1 to start the pilot injection from the injector 1.

At the same time that the supply of electricity to the injection control solenoid valve is started (timing B1), the pressure sensor 13 detects the common rail pressure. Then, when the pressure within the common rail has been detected, the injection duration computation means 12B receives the detection signal of the common rail pressure from the pressure sensor 13, and based on this common rail pressure and the pilot fuel injection amount that has been determined in advance by the injection amount determination means 12E according to the engine operating state, starts the operation of calculating that fuel injection duration. That is, calculation of the fuel injection duration (the time from the start of fuel injection to the end of fuel injection) is started at substantially the same time as the start of the pilot fuel injection. In the case shown in FIG. 11, T1 indicates the computed time for the pilot fuel injection duration. Tdur1 is found as the pilot fuel injection duration through this computation, and the supply of electricity to the injection control solenoid valve is interrupted at the timing C1 to stop the pilot fuel injection.

Then, at the timing B2, the supply of electricity to the injection control solenoid valve is restarted to start the main injection from the injector 1.

At the same time that the supply of electricity to the injection control solenoid valve is started (timing B2), the pressure sensor 13 detects the common rail pressure. Then, when the pressure within the common rail has been detected, the injection duration computation means 12B receives the detection signal of the common rail pressure from the pressure sensor 13, and based on this common rail pressure and the main fuel injection amount that has been determined in advance by the injection amount determination means 12E according to the engine operating state, starts the operation of calculating that fuel injection duration. That is, calculation of the fuel injection duration (the time from the start of fuel injection to the end of fuel injection) is started substantially simultaneous to the start of the main fuel injection. In the case shown in FIG. 11, T2 shows the computed time for the main fuel injection duration. Tdur2 is found as the main fuel injection duration through this computation, and the supply of electricity to the injection control solenoid valve is interrupted at the timing C2 to stop the main fuel injection.

In this way, with this embodiment it is possible to calculate the fuel injection duration based on the common rail pressure at the moment that fuel injection is started in both the pilot injection and the main injection, and this allows a fuel injection duration that is suited for the actual common rail pressure at the moment that fuel injection is started to be obtained. The result is that the desired engine output can be obtained without too much or too little fuel injection, while securing the benefits of performing a pilot injection, which are that combustion noise and vibration are reduced and startability and fuel economy are improved, and allows a reduction in harmful substances that are discharged to be achieved.

Third Embodiment

A third embodiment is described next. This embodiment, like the second embodiment discussed above, is described with respect to a case where the present invention has been adopted for a pressure accumulation-type fuel injection device that performs the fuel injection operation twice (pilot injection and main injection) for the same cylinder during one cycle of the engine. It should be noted that here only those aspects that are different from the second embodiment are discussed.

The pressure sensor 13 according to this embodiment detects the common rail pressure at the start of the pilot injection and the main injection.

It is also necessary to provide pressure detection time recognition means 12F for recognizing the detection time of the common rail pressure.

The injection duration computation means 12B, for the pilot injection, which is the initial fuel injection operation in a single cycle, receives the detection signal of the common rail pressure when the pressure sensor 13 has detected the common rail pressure (the time at which pilot injection is started) and starts the operation for calculating the fuel injection duration based on this common rail pressure and the fuel injection amount of the pilot injection that has been determined in advance by the injection amount determination means 12E according to the engine operating state, and for the main injection, which is the second and subsequent fuel injection operations within the cycle, the injection duration computation means 12B receives the detection signal of the common rail pressure when the pressure sensor 13 has detected the common rail pressure at the main injection start time, which is the current injection timing, and estimates the pressure waveform based on the current pressure signal, the previous pressure signal, that is, the pressure signal at the start time of the pilot injection and the pressure signal detection time of the previous and the current pressure signals, which have been recognized by the pressure detection time recognition means 12F, and corrects the common rail pressure that has been detected at the main injection timing based on this estimation, and based on this corrected common rail pressure and the fuel injection amount of the main injection that has been determined in advance by the injection amount determination means 12E according to the engine operating state, starts the operation for calculating that fuel injection duration.

Figure 12:
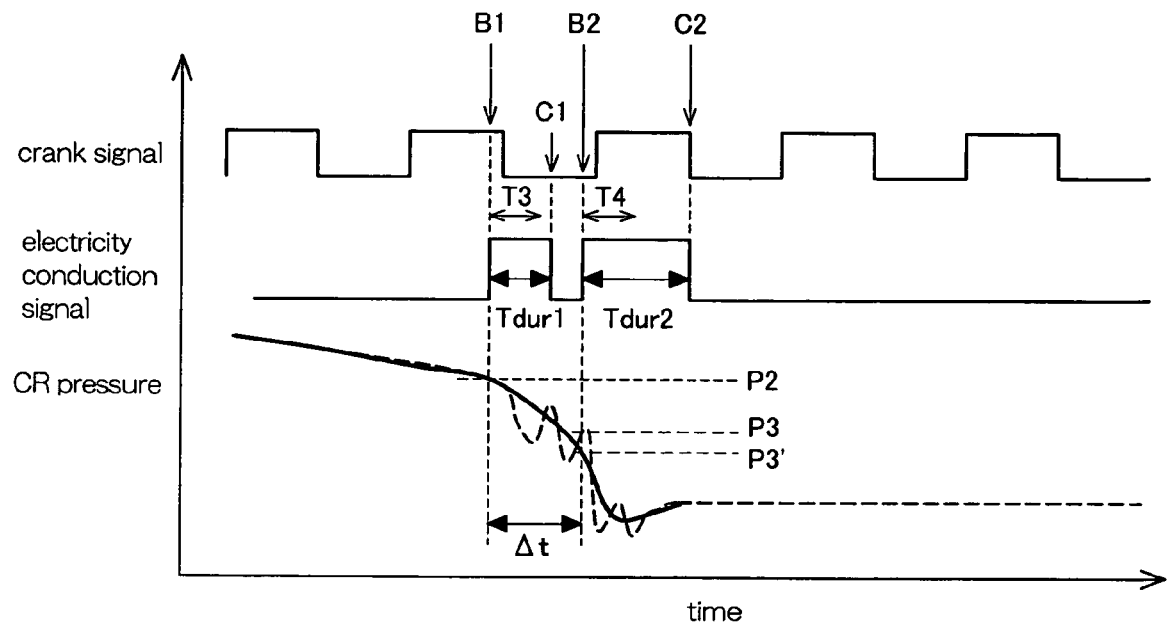
FIG. 12 is a diagram that shows the change in the crank signal, the electricity conduction signal to the injector, and the common rail pressure, at the fuel injection timing in the third embodiment.

FIG. 12 shows the change in the crank signal, the electricity conduction signal to the injection control solenoid valve of the injector 1, and the common rail pressure, at the timing that the fuel is injected from a certain injector 1 (for example, the injector of the first cylinder). In FIG. 12, the broken line showing the change in common rail pressure indicates the change in the value detected by the pressure sensor 13, and the solid line indicates the change estimation value of the common rail pressure that is estimated by the injection duration computation means 12B.

In this case, the change in the common rail pressure shown by the broken line in the drawing is the pressure change in the local region (space) around the pressure sensor 13, and is significantly affected by pressure fluctuations that occur within the common rail 2 (pulsations accompanying the wave motion within the common rail). Thus, even if the detected value at the start of the main injection (the point B2 in the drawing) is P3, the common rail pressure that actually affects the fuel injection amount has become P3'. In this embodiment, for the main injection, which is the second and subsequent fuel injection operations within one cycle, in order to ease the effects of pressure fluctuations that occur in the common rail 2, the pressure waveform is estimated based on the pressure detection time and the pressure signal at that pressure detection time, and the common rail pressure that has been detected at the main injection timing is corrected so that it becomes the common rail pressure that actually affects the fuel injection amount, and based on this corrected common rail pressure and the fuel injection amount of the main injection that has been determined in advance by the injection amount determination means 12E according to the engine operating state, the fuel injection duration is calculated. As for the method of this estimation, it is possible to find the frequency of the pulsation and the attenuation coefficient of this pulsation based on the pressure drop due to the pilot injection, the fluid properties of the fuel that is used, or the geometric data of the common rail, and thus it is possible to find the center line (solid line in the drawing) of the pulsating waveform as a function of time ($\Delta t$) from the start of the pilot injection to the start of the main injection. Consequently, this is used as the estimated common rail pressure change. Thus, even if the pressure sensor 13 detects a common rail pressure P3, the actual common rail pressure that affects the fuel injection amount can be found as P3', and it is this value P3' that is used to calculate the injection duration of the main injection.

The specific operation is described below. First, the fuel injection start timing is calculated by the injection start time determination means 12D based on various engine information, such as the engine revolution and the engine load. In the case shown in FIG. 12, the supply of electricity to the injection control solenoid valve is started at timing B1 to start the pilot injection from the injector 1.

The pressure sensor 13 detects the common rail pressure simultaneous to the start of electricity to the injection control solenoid valve F (the point of timing B1). At this time, the pressure detection time recognition means 12F recognizes and stores the pressure detection time. Then, when the common rail pressure has been detected, the injection duration computation means 12B receives the detection signal of the common rail pressure from the pressure sensor 13 and starts the operation for calculating the fuel injection duration based on this common rail pressure and the pilot fuel injection amount that has been determined in advance by the injection amount determination means 12E according to the engine operating state. On the other hand, for the main injection, the pressure sensor 13 detects the common rail pressure at the same time that the supply of electricity to the injection control solenoid valve is started (the point of timing B2). At this time, in the same way as above, the pressure detection time recognition means 12F recognizes and stores the pressure detection time. Then, when the common rail pressure has been detected, first the injection duration computation means 12B estimates the pressure waveform based on the common rail pressure at the pilot injection timing, which is the previous injection operation, and its detection time, and the common rail pressure at the main injection timing and its detection time, and based on this corrected common rail pressure and the fuel injection amount of the main injection that has been determined in advance by the injection amount determination means 12E according to the engine operating state, the injection duration computation means 12B starts the operation for calculating that fuel injection duration. That is, when calculating the second or subsequent fuel injection duration, first the impact of pulsations within the common rail that occur due to the pilot injection is estimated and used to correct the common rail pressure, and then the common rail pressure after correction is used. In the case shown in FIG. 12, T3 indicates the calculated time for the fuel injection duration of the pilot injection, and T4 indicates the calculated time for the fuel injection duration of the main injection. With this computation, Tdur1 is found as the pilot fuel injection duration and the supply of electricity to the injection control solenoid valve is interrupted at the timing C1 to end the pilot fuel injection, whereas Tdur2 is found as the main fuel injection duration and the supply of electricity to the injection control solenoid valve is interrupted at the timing C2 to end the main fuel injection.

In this way, with this embodiment the effect of pressure fluctuations (pulsations) that occur in the common rail 2 is estimated and used to correct the common rail pressure that has been detected at the main injection timing so that it becomes the common rail pressure that will actually influence the fuel injection amount, and based on this corrected common rail pressure and the fuel injection amount of the main injection that has been determined in advance by the injection amount determination means according to the engine operating state, that fuel injection duration is calculated. Thus, it is possible to ease the effects of pressure fluctuation due to the pilot injection so as to suitably obtain an injection amount of the main injection, it is possible to obtain the desired engine output, and a reduction in the harmful substances that are discharged can be achieved.

Other Embodiments

The above embodiments describe cases in which the invention is adopted for pressure accumulation-type fuel injection devices that are provided in the fuel supply system of a six-cylinder marine diesel engine. The present invention is not limited by this, however, and it can be adopted for various engine types, including four-cylinder marine diesel engines. The invention also is not limited to marine engines, and can be adopted in engines that are used in other applications such as automobiles.

Apparatuses that perform multiple injections during a single cycle of the engine are not limited to those that perform the two injections of a pilot injection and a main injection, and the invention also can applied to apparatuses in which injection is performed three or more times. For example, the techniques of the second embodiment and the third embodiment can be adopted for each injection of a pressure accumulation-type fuel injection device that performs a pre-injection, a pilot injection, a main injection, an after injection, and a post injection.

It should be noted that the present invention can be worked in various other forms without deviating from the basic characteristics or the spirit thereof. Accordingly, the embodiments given above are in all respects nothing more than examples, and should not be interpreted as being limiting in nature. The scope of the present invention is indicated by the claims, and is not restricted in any way to the text of this specification. Furthermore, all modifications and variations belonging to equivalent claims of the patent claims are within the scope of the present invention.

Also, this application claims priority right on the basis of Japanese Patent Application 2004-204346 submitted in Japan on Jul. 12, 2004, the entire contents of which are herein incorporated by reference.

INDUSTRIAL APPLICABILITY

The present invention is useful for internal combustion engines and in particular diesel engines.

The invention claimed is:

1. A pressure accumulation-type fuel injection device provided with a fuel pump that delivers fuel under pressure, a common rail that holds the fuel that has been delivered under pressure by the fuel pump, and a fuel injection valve that injects fuel that has been supplied from the common rail, comprising:

injection amount determination means for determining a fuel injection amount of said fuel injection valve according to engine operating state;

injection start time determination means for determining a fuel injection start time of said fuel injection valve according to engine operating state;

pressure detection means for detecting a common rail pressure at a fuel injection start time that has been determined by said injection start time determination means; and injection duration calculation means that receives a detection signal on the common rail pressure when said pressure detection means detects the common rail pressure, and calculates a fuel injection duration that is in accordance with that common rail pressure and the injection amount that has been determined by said injection amount determination means, wherein the fuel injection operation of said fuel injection valve is ended at the point that the fuel injection duration that has been calculated by said injection duration calculation means has elapsed from a fuel injection start time of said fuel injection valve, and wherein in said injection start time determination means, the fuel injection start time of said fuel injection valve according to an engine operating state is calculated by a crank angle unit, and then a fuel start crank angle is divided into a pulse number of a detection unit angle and the crank angle of less than the detection unit, and the crank angle of less than the detection unit is calculated by a time unit based on an engine revolution.

2. An internal combustion engine that is furnished with any one pressure accumulation-type fuel injection device according to claim 1.

3. A multiple injection type pressure accumulation-type fuel injection device provided with a fuel pump that delivers fuel under pressure, a common rail that holds the fuel that has been delivered under pressure by the fuel pump, and a fuel injection valve that injects fuel that has been supplied from the common rail, wherein the fuel injection valve performs a plural number of fuel injection operations in a same cylinder in one cycle of the engine, comprising:

injection amount determination means for determining a fuel injection amount of said fuel injection valve in each said fuel injection operation according to engine operating state;

injection start time determination means for determining a fuel injection start time of said fuel injection valve in each said fuel injection operation according to engine operating state;

pressure detection means for detecting a common rail pressure at each fuel injection start time that has been determined by said injection start time determination means; and injection duration calculation means that receives a detection signal on the common rail pressure each time said pressure detection means detects the common rail pressure, and calculates a fuel injection duration that corresponds to that common rail pressure and the injection amount in the respective fuel injection operation that has been determined by said injection amount determination means, wherein each fuel injection operation is ended at the point that the fuel injection duration that has been calculated by said injection duration calculation means has elapsed from the fuel injection start time of said fuel injection valve, and wherein in said injection start time determination means, the fuel injection start time of said fuel injection valve according to an engine operating state is calculated by a crank angle unit, and then a fuel start crank angle is divided into a pulse number of a detection unit angle and the crank angle of less than the detection unit, and the crank angle of less than the detection unit is calculated by a time unit based on an engine revolution.

4. The pressure accumulation-type fuel injection device according to claim 3, wherein the plural number of fuel injection operations that are performed by said fuel injection valve in a single cycle of the engine is at least two times.

5. An internal combustion engine that is furnished with any one pressure accumulation-type fuel injection device according to claim 4.

6. An internal combustion engine that is furnished with any one pressure accumulation-type fuel injection device according to claim 3.

7. A multiple injection type pressure accumulation-type fuel injection device provided with a fuel pump that delivers fuel under pressure, a common rail that holds the fuel that has been delivered under pressure by the fuel pump, and a fuel injection valve that injects fuel that has been supplied from the common rail, wherein the fuel injection valve performs a plural number of fuel injection operations in a same cylinder in one cycle of the engine, comprising:

injection amount determination means for determining a fuel injection amount of said fuel injection valve in each fuel injection operation according to engine operating state;

injection start time determination means for determining a fuel injection start time of said fuel injection valve in each fuel injection operation according to engine operating state;

pressure detection means for detecting a common rail pressure at each fuel injection start time that has been determined by said injection start time determination means;

pressure detection time recognition means for recognizing a detection time of the common rail pressure; and injection duration calculation means which, in an initial fuel injection operation in a single cycle of the engine, receives a detection signal on the common rail pressure when said pressure detection means has detected the common rail pressure, and calculates a fuel injection duration that corresponds to the common rail pressure and the injection amount that has been determined by said injection amount determination means, and in the second and subsequent fuel injection operations in a single cycle of the engine, receives a detection signal regarding the common rail pressure when said pressure detection means has detected the common rail pressure, and corrects this common rail pressure using parameters including the current and the previous detection values and at least the current and the previous pressure detection times, and calculates a fuel injection duration that corresponds to that corrected common rail pressure and the fuel injection amount in the respective fuel injection operation that has been determined by said injection amount determination means, wherein each fuel injection operation is ended at the point that the fuel injection duration that has been calculated by said injection duration calculation means has elapsed from the fuel injection start time of said fuel injection valve, and wherein in said injection start time determination means, the fuel injection start time of said fuel injection valve according to an engine operating state is calculated by a crank angle unit, and then a fuel start crank angle is divided into a pulse number of a detection unit angle and the crank angle of less than the detection unit, and the crank angle of less than the detection unit is calculated by a time unit based on an engine revolution.

8. The pressure accumulation-type fuel injection device according to claim 7, wherein the parameters further include at least fluid properties of the fuel, and geometric data on the common rail.

9. An internal combustion engine that is furnished with any one pressure accumulation-type fuel injection device according to claim 8.

10. The pressure accumulation-type fuel injection device according to claim 7, wherein the plural number of fuel injection operations that are performed by said fuel injection valve in a single cycle of the engine is at least two times.

11. An internal combustion engine that is furnished with any one pressure accumulation-type fuel injection device according to claim 10.

12. An internal combustion engine that is furnished with any one pressure accumulation-type fuel injection device according to claim 7.

* * * * *